(12) United States Patent
Lee et al.

(10) Patent No.: US 12,555,807 B2
(45) Date of Patent: Feb. 17, 2026

(54) FUEL CELL SYSTEM

(71) Applicants: Hyundai Motor Company, Seoul (KR); Kia Corporation, Seoul (KR)

(72) Inventors: Ju Yong Lee, Suwon-si (KR); Sang Mi Choi, Suwon-si (KR); Kyoung Ku Ha, Seoul (KR); Yeon Su Nam, Bucheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 678 days.

(21) Appl. No.: 18/080,108

(22) Filed: Dec. 13, 2022

(65) Prior Publication Data

US 2024/0047720 A1  Feb. 8, 2024

(30) Foreign Application Priority Data

Aug. 3, 2022  (KR) .................. 10-2022-0096879

(51) Int. Cl.
 *H01M 8/04746* (2016.01)
 *H01M 8/0432* (2016.01)
 *H01M 8/0438* (2016.01)
 *H01M 8/04828* (2016.01)
 *H01M 8/0662* (2016.01)

(52) U.S. Cl.
 CPC ... *H01M 8/04753* (2013.01); *H01M 8/04335* (2013.01); *H01M 8/04395* (2013.01); *H01M 8/04835* (2013.01); *H01M 8/0687* (2013.01)

(58) Field of Classification Search
 CPC ......... H01M 8/04753; H01M 8/04708; H01M 8/04335; H01M 8/04395; H01M 8/04835; H01M 8/0687; H01M 8/04992
 See application file for complete search history.

(56) References Cited

U.S. PATENT DOCUMENTS 9,065,094 B2   6/2015  Merth et al.
2022/0149399 A1*  5/2022  Jung ................. H01M 8/04753
2022/0399557 A1* 12/2022  Hellmann ......... H01M 8/04104

FOREIGN PATENT DOCUMENTS

KR  20220164262 A  12/2022

* cited by examiner

*Primary Examiner* — Christopher P Domone
(74) *Attorney, Agent, or Firm* — Fish & Richardson P.C.

(57) ABSTRACT

Disclosed is a fuel cell system including a fuel cell stack, an enclosure surrounding the fuel cell stack, an air supply line connected to the fuel cell stack and configured to supply air to the fuel cell stack, an air compressor disposed in the air supply line and configured to compress and supply air, a cooler disposed in the air supply line, positioned at a downstream side of the air compressor, and configured to cool the air having passed through the air compressor, a bypass line having one end disposed between the air compressor and the cooler and connected to the air supply line, the other end connected to a separation space between the fuel cell stack and the enclosure, and a circulation line having one end connected to the separation space, the other end disposed at a downstream side of the cooler and connected to the air supply line.

15 Claims, 5 Drawing Sheets

FUEL CELL SYSTEM

CROSS-REFERENCE TO RELATED APPLICATION

This application claims priority to and the benefit of Korean Patent Application No. 10-2022-0096879 filed in the Korean Intellectual Property Office on Aug. 3, 2022, the entire contents of which are incorporated herein by reference.

TECHNICAL FIELD

The present disclosure relates to a fuel cell system, and more particularly, to a fuel cell system capable of improving safety and reliability.

BACKGROUND ART

A fuel cell electric vehicle (FCEV) produces electrical energy from an electrochemical reaction between oxygen and hydrogen in a fuel cell stack and travels by operating a motor.

The fuel cell electric vehicle may continuously generate electricity, regardless of a capacity of a battery, by being supplied with fuel (hydrogen) and air from the outside, and thus has high efficiency, and emits almost no contaminant. By virtue of these advantages, continuous research and development is being conducted on the fuel cell electric vehicle.

In general, the fuel cell electric vehicle may include a fuel cell stack configured to generate electricity by means of an oxidation-reduction reaction between hydrogen and oxygen, a fuel supply device configured to supply fuel (hydrogen) to the fuel cell stack, and an air supply device configured to supply the fuel cell stack with reaction air (oxygen) which is an oxidant required for an electrochemical reaction.

In addition, an enclosure may be provided around the fuel cell stack to protect the fuel cell stack. A predetermined space may be provided between the enclosure and the fuel cell stack.

In some cases, when condensate water, which is produced during an operation of the fuel cell stack, and water, which is condensed because of a difference between temperatures inside and outside the enclosure, remain in the separation space between the fuel cell stack and the enclosure, the fuel cell stack and an external component may be electrically connected by means of the condensate water. Therefore, the separation space between the fuel cell stack and the enclosure should be sufficiently ventilated.

Therefore, recently, various studies have been conducted to effectively ventilate the separation space between the fuel cell stack and the enclosure and prevent the situation in which condensate water remains in the separation space, but the study results are still insufficient. Accordingly, there is a need to develop a technology to effectively ventilate the separation space between the fuel cell stack and the enclosure and help prevent the situation in which condensate water remains in the separation space.

SUMMARY

The present disclosure has been made in an effort to provide a fuel cell system capable of improving safety and reliability.

In particular, the present disclosure has been made in an effort to effectively ventilate a separation space between a fuel cell stack and an enclosure and prevent a situation in which condensate water remains in the separation space.

The present disclosure has also been made in an effort to minimize a deterioration in efficiency of an air compressor and prevent damage to the air compressor.

The present disclosure has also been made in an effort to ensure efficiency in ventilating an enclosure and stably ensure a supply flow rate of air to be supplied to a fuel cell stack.

The present disclosure has also been made in an effort to maintain a constant ventilation flow rate of air to be supplied to an enclosure without being restricted by a layout of a peripheral component.

The present disclosure has also been made in an effort to ensure efficiency in ventilating an enclosure and prevent damage to a humidifier.

The present disclosure has also been made in an effort to simplify a structure, improve a degree of design freedom and spatial utilization, and reduce costs.

The present disclosure has also been made in an effort to prevent a level of condensate water from being excessively increased in an enclosure and to meet waterproof requirements (IPX7) with respect to immersion in water up to 1 meter in depth.

The objects to be achieved by the implementations are not limited to the above-mentioned objects, but also include objects or effects that may be understood from the solutions or implementations described below.

An exemplary implementation of the present disclosure provides a fuel cell system including: a fuel cell stack; an enclosure configured to surround the fuel cell stack; an air supply line connected to the fuel cell stack and configured to supply air to the fuel cell stack; an air compressor disposed in the air supply line and configured to compress and supply air; a cooler disposed in the air supply line, positioned at a downstream side of the air compressor, and configured to cool the air having passed through the air compressor; a bypass line having one end disposed between the air compressor and the cooler and connected to the air supply line, and the other end connected to a separation space between the fuel cell stack and the enclosure; and a circulation line having one end connected to the separation space, and the other end disposed at a downstream side of the cooler and connected to the air supply line.

This is to improve safety and reliability of the fuel cell system.

That is, when condensate water, which is produced during an operation of the fuel cell stack, and water, which is condensed because of a difference between temperatures inside and outside the enclosure, remain in the separation space between the fuel cell stack and the enclosure, the fuel cell stack and an external component may be electrically connected by means of the condensate water. Therefore, the separation space between the fuel cell stack and the enclosure should be sufficiently ventilated.

In the implementation of the present disclosure, a part of the air to be supplied to the fuel cell stack through the air supply line is supplied to the separation space between the fuel cell stack and the enclosure through the bypass line. Therefore, it is possible to obtain an advantageous effect of effectively ventilating the separation space between the fuel cell stack and the enclosure and preventing a situation in which condensate water remains in the separation space.

Among other things, in the implementation of the present disclosure, the air having passed through the air compressor flows to the enclosure before passing through the cooler, and the air, which has passed through (has ventilated) the enclosure, circulates to the air supply line again from the downstream side of the air compressor (the downstream side of the cooler) instead of the upstream side of the air compressor. Therefore, it is possible to obtain an advantageous effect of minimizing a deterioration in efficiency of the air compressor and stably ensuring a supply flow rate of air to be supplied to the fuel cell stack.

In addition, in the implementation of the present disclosure, the air having passed through the air compressor flows to the enclosure before passing through the cooler, and the air, which has passed through (has ventilated) the enclosure, circulates to the air supply line again from the downstream side of the air compressor (the downstream side of the cooler) instead of the upstream side of the air compressor. Therefore, the differential pressure of the cooler (the differential pressure between the inlet end and the outlet end of the cooler) may ensure a sufficient flow rate (ventilation flow rate) of air to be supplied to the enclosure.

Moreover, in the implementation of the present disclosure, because the air, which has passed through (has ventilated) the enclosure, circulates to the air supply line again from the downstream side of the air compressor (the downstream side of the cooler), the air (air containing droplets), which has passed through (has ventilated) the enclosure, is prevented from being introduced directly into the air compressor. Therefore, it is possible to obtain an advantageous effect of improving safety and reliability while preventing damage to the air compressor caused by the droplets (e.g., damage to a blade of the air compressor caused by the droplets).

In addition, according to the exemplary implementation of the present disclosure, it is not necessary to additionally provide a separate fan (an air supply fan) to forcibly supply the air for ventilating the interior of the enclosure. Therefore, it is possible to obtain an advantageous effect of simplifying the structure and improving the degree of design freedom and spatial utilization.

According to the exemplary implementation of the present disclosure, the fuel cell system may include the humidifier positioned in the air supply line, positioned at the downstream side of the cooler, and configured to humidify the air having passed through the cooler.

According to the exemplary implementation of the present disclosure, the other end (an outlet end) of the circulation line may be disposed between the cooler and the humidifier and connected to the air supply line.

As described above, in the implementation of the present disclosure, the air, which has passed through (has ventilated) the enclosure, circulates to the air supply line again from the downstream side of the air compressor (the downstream side of the cooler) instead of the upstream side of the air compressor. Therefore, the air having passed through the enclosure may be merged again into the air supply line at the downstream side of the of the air compressor (the downstream side of the cooler) and supplied to the fuel cell stack even though a part of the air supplied through the air supply line flows into the enclosure. Therefore, the maximum flow rate of the air finally supplied to the fuel cell stack may satisfy the target flow rate according to the maximum RPM of the air compressor.

According to the exemplary implementation of the present disclosure, the fuel cell system may include a buffer space disposed between the cooler and the humidifier and configured to communicate with the air supply line, and the circulation line may be connected to the buffer space.

As described above, the buffer space is provided between the cooler and the humidifier, and the high-temperature air having passed through the enclosure is supplied to the humidifier in a state in which the high-temperature air is mixed with the air cooled by the cooler (in a state in which a temperature of the air is decreased). Therefore, it is possible to obtain an advantageous effect of preventing damage to the humidifier (e.g., damage to the humidification membrane and the potting material) caused by the high-temperature air.

According to the exemplary implementation of the present disclosure, the fuel cell system may include an air guide disposed in the buffer space and configured to guide the air, which is introduced into the buffer space through the circulation line, toward the cooler.

As described above, the air guide is provided in the buffer space and guides the air, which is introduced into the buffer space, toward the cooler. Therefore, it is possible to obtain an advantageous effect of maximally preventing the air having passed through the enclosure from being introduced directly into the humidifier. Further, it is possible to obtain an advantageous effect of more quickly and effectively decreasing the temperature of the air having passed through the enclosure.

According to the exemplary implementation of the present disclosure, the fuel cell system may include a bypass valve disposed in the bypass line and configured to adjust a flow of air flowing through the bypass line.

In particular, the bypass valve may selectively adjust the flow of the air flowing through the bypass line based on a temperature or pressure of the air flowing through the bypass line.

As described above, in the implementation of the present disclosure, the bypass valve is provided in the bypass line, which makes it possible to adjust and manage a flow rate of air to be supplied to the enclosure to ventilate the enclosure in accordance with the operating condition of the fuel cell stack.

In addition, in the implementation of the present disclosure, the bypass line may be selectively opened or closed by the bypass valve, and thus the bypass line may be selectively opened only when the pressure and temperature of the air flowing through the bypass line satisfy preset reference conditions. Therefore, it is possible to obtain an advantageous effect of preventing the air supplied through the air supply line from flowing through the bypass line in a situation in which the ventilation of the enclosure is not required.

In addition, according to the exemplary implementation of the present disclosure, the fuel cell system may include a circulation valve disposed in the circulation line and configured to adjust a flow of air flowing through the circulation line.

In particular, the circulation valve may selectively adjust the flow of the air flowing through the circulation line based on a temperature of the air flowing through the bypass line.

According to the exemplary implementation of the present disclosure, the fuel cell system may include a flow path change unit disposed in at least any one of the bypass line and the circulation line and configured to change a cross-sectional flow path area through which air passes.

As described above, according to the implementation of the present disclosure, the flow path change unit may be provided in at least any one of the bypass line and the circulation line and adjust the differential pressure of the bypass line or the circulation line. Therefore, it is possible to obtain an advantageous effect of minimizing the deviation of the ventilation flow rate (the flow rate of the air flowing from the air supply line to the enclosure) caused by the layout of the bypass line and the layout of the circulation line.

The flow path change unit may have various structures capable of changing the cross-sectional flow path area through which air passes.

According to the exemplary implementation of the present disclosure, the flow path change unit may include a first adapter member having a first cross-sectional flow path area through which air passes, and a second adapter member having a second cross-sectional flow path area different from the first cross-sectional flow path area. At least any one of the first adapter member and the second adapter member may be provided in at least any one of the bypass line and the circulation line and change the cross-sectional flow path area.

According to the exemplary implementation of the present disclosure, the fuel cell system may include a filter member disposed in the bypass line and configured to filter the air passing through the bypass line.

Because the filter member is provided in the bypass line as described above, the air to be supplied to the fuel cell stack through the air supply line may be primarily filtered by the air filter and then secondarily filtered by the filter member. Therefore, it is possible to obtain an advantageous effect of minimizing the number of foreign substances such as dust to be introduced into the enclosure and the fuel cell stack and further improving safety and reliability.

According to the exemplary implementation of the present disclosure, the fuel cell system may include a circulation line filter member disposed in the circulation line and configured to filter the air passing through the circulation line.

DETAILED DESCRIPTION

Hereinafter, exemplary implementations of the present disclosure will be described in detail with reference to the accompanying drawings.

However, the technical spirit of the present disclosure is not limited to some implementations described herein but may be implemented in various different forms. One or more of the features in the implementations may be selectively combined and substituted for use within the scope of the technical spirit of the present disclosure.

In addition, unless otherwise specifically and explicitly defined and stated, the terms (including technical and scientific terms) used in the implementations of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the implementations of the present disclosure are for explaining the implementations, not for limiting the present disclosure.

Figure 1:
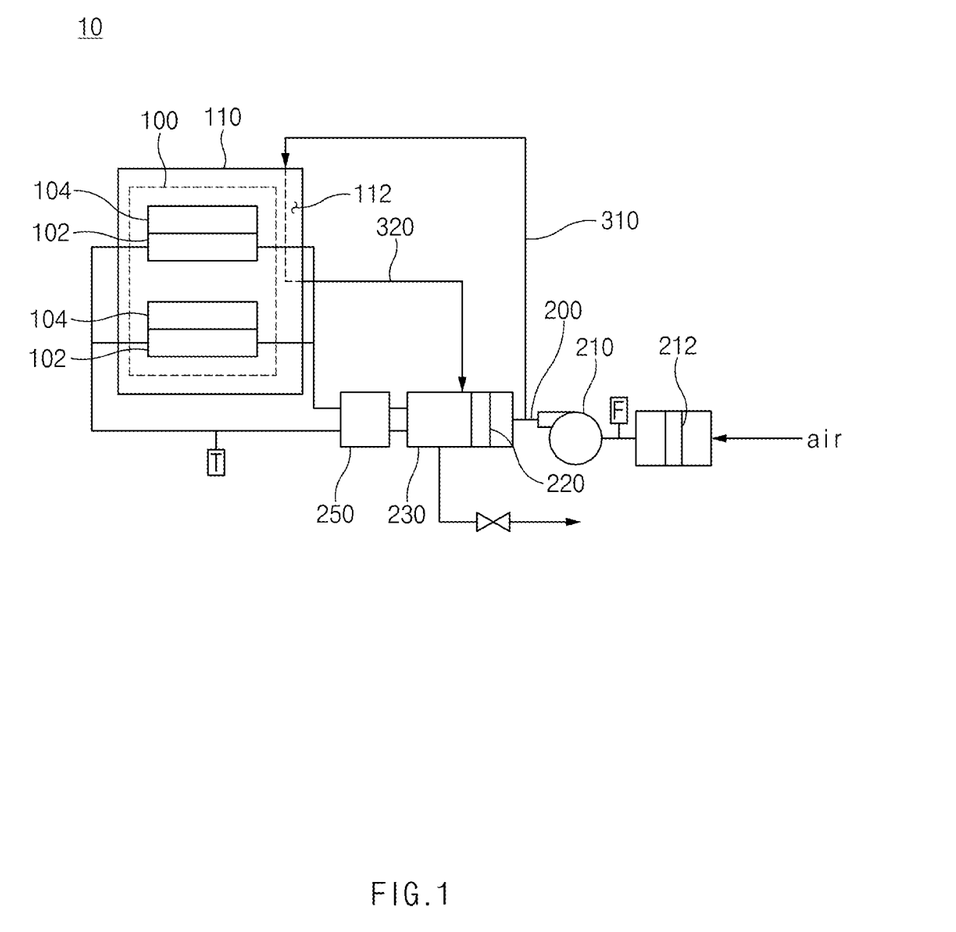
FIG. 1 is a schematic view of an example fuel cell system according to an implementation of the present disclosure.
Figure 2:
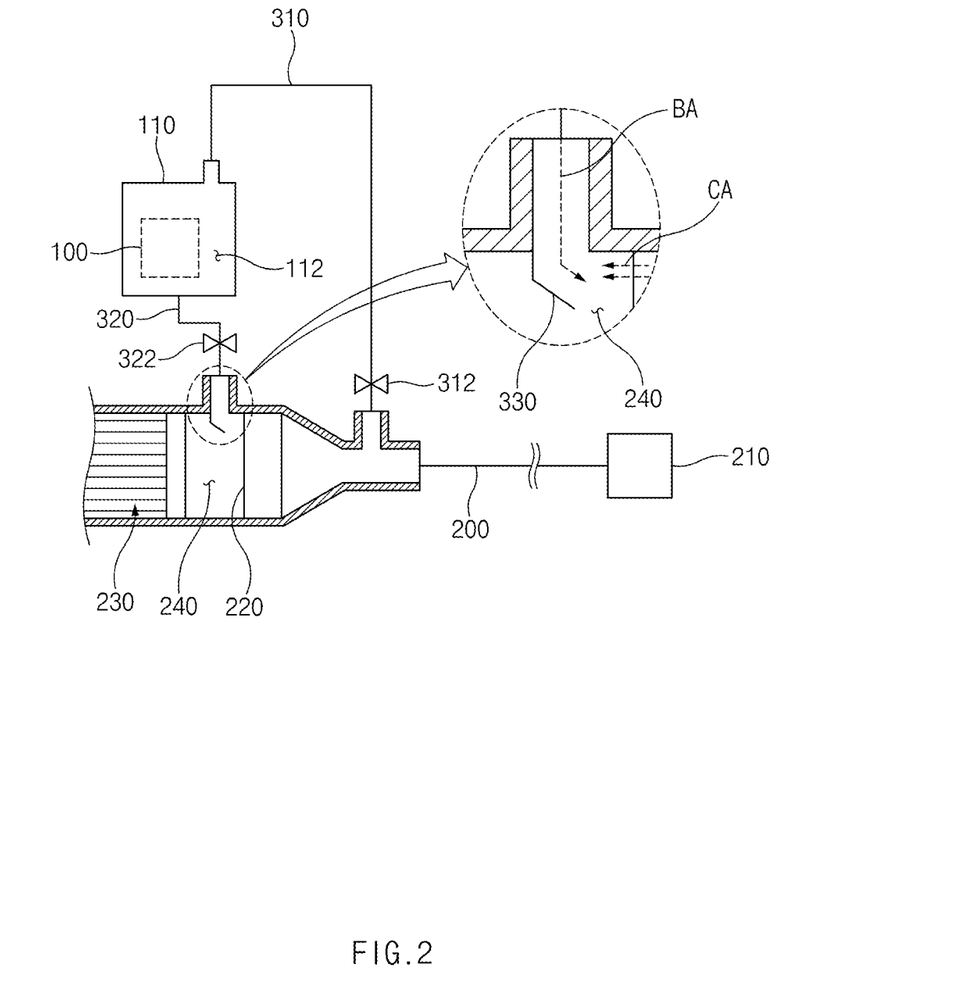
FIG. 2 is a schematic view of an example bypass valve and a circulation valve in the fuel cell system according to the implementation of the present disclosure.

Referring to FIGS. 1 and 2, a fuel cell system 10 according to an implementation of the present disclosure includes: a fuel cell stack 100; an enclosure 110 configured to surround the fuel cell stack 100; an air supply line 200 connected to the fuel cell stack 100 and configured to supply air to the fuel cell stack 100; an air compressor 210 provided in the air supply line 200 and configured to compress and supply air; a cooler 220 provided in the air supply line 200, positioned at a downstream side of the air compressor 210, configured to cool air having passed through the air compressor 210; a bypass line 310 having one end disposed between the air compressor 210 and the cooler 220 and connected to the air supply line 200, and the other end connected to a separation space 112 between the fuel cell stack 100 and the enclosure 110; and a circulation line 320 having one end connected to the separation space 112, and the other end disposed at a downstream side of the cooler 220 and connected to the air supply line 200.

For reference, the fuel cell system 10 according to the implementation of the present disclosure may be applied to various vehicles (e.g., construction machines or passenger vehicles), ships, mobility vehicles in aerospace fields to which the fuel cell stack 100 may be applied. The present disclosure is not restricted or limited by the type and properties of an object to which the fuel cell system 10 is applied.

The fuel cell stack 100 refers to a kind of power generation device that generates electrical energy through a chemical reaction of fuel (e.g., hydrogen). The fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) having catalyst electrode layers in which electrochemical reactions occur and which are attached to two opposite sides of an electrolyte membrane through which hydrogen ions move; a gas diffusion layer (GDL) configured to uniformly distribute reactant gases and transfer generated electrical energy; a gasket and a fastener configured to maintain leakproof sealability for the reactant gases and a coolant and maintain an appropriate fastening pressure; and a separator (bipolar plate) configured to move the reactant gases and the coolant.

More specifically, in the fuel cell, hydrogen, which is fuel, and air (oxygen), which is an oxidant, are supplied to an anode 104 and a cathode 102 of the membrane electrode assembly, respectively, through flow paths in the separator, such that the hydrogen is supplied to the anode 104, and the air is supplied to the cathode 102.

The hydrogen supplied to the anode 104 is decomposed into hydrogen ions (protons) and electrons by catalysts in the electrode layers provided at two opposite sides of the electrolyte membrane. Only the hydrogen ions are selectively transmitted to the cathode 102 through the electrolyte membrane, which is a cation exchange membrane, and at the same time, the electrons are transmitted to the cathode 102 through the gas diffusion layer and the separator which are conductors.

At the cathode 102, the hydrogen ions supplied through the electrolyte membrane and the electrons transmitted through the separator meet oxygen in the air supplied to the cathode 102 by an air supply device, thereby creating a reaction of producing water. As a result of the movement of the hydrogen ions, the electrons flow through external conductive wires, and the electric current is generated as a result of the flow of the electrons.

The enclosure 110 surrounds the entire periphery of the fuel cell stack 100 to protect the fuel cell stack 100.

More specifically, the enclosure 110 has a predetermined volume capable of accommodating the fuel cell stack 100 therein. A predetermined space may be defined between the fuel cell stack 100 and an inner surface of the enclosure 110.

The enclosure 110 may have various structures capable of surrounding the fuel cell stack 100. The present disclosure is not restricted or limited by the structure and shape of the enclosure 110.

For example, the enclosure 110 may include a first housing (e.g., an upper housing made of a metallic material) and a second housing (e.g., a lower housing made of a metallic material), and the first housing and the second housing may collectively define a sealed chamber. According to another implementation of the present disclosure, three or more housings may be used to form the enclosure. The present disclosure is not restricted or limited by the material of the housing.

The air supply line 200 is connected to the fuel cell stack 100 to supply air to the fuel cell stack 100.

More specifically, one end of the air supply line 200 may be connected to the air compressor 210, and the other end of the air supply line 200 may pass through the enclosure 110 and be connected to the cathode of the fuel cell stack 100.

The air supply line 200 may have various structures capable of connecting the air compressor 210 and the fuel cell stack 100. The present disclosure is not restricted or limited by the structure of the air supply line 200.

For reference, even though the air supply line 200 passes through the enclosure 110, the air supplied through the air supply line 200 cannot be supplied to the separation space 112 between the fuel cell stack 100 and the enclosure 110, and the supply of air to the separation space 112 between the fuel cell stack 100 and the enclosure 110 may be performed only through the bypass line 310. In addition, the fuel cell system 10 may include an air discharge line configured to connect the fuel cell stack 100 and a humidifier 230 and guide the air (moist air), which is discharged from the fuel cell stack 100, to the humidifier 230.

More specifically, one end of the air discharge line may be connected to an outlet of the cathode 102, and the other end of the air discharge line may be connected to a moist air supply port of the humidifier 230.

Further, an air control valve 250 may be provided in the air discharge line and the air supply line 200 and control air (e.g., a flow of air) to be introduced into the fuel cell stack 100 and air (e.g., a flow of air) to be discharged from the fuel cell stack 100.

A typical compressor capable of compressing and supplying air to be supplied to the fuel cell stack 100 may be used as the air compressor 210. The present disclosure is not restricted or limited by the type and structure of the air compressor 210.

The air compressor 210 may compress air so that the air has a sufficient pressure that allows the air to pass through an inner flow path of the fuel cell stack 100. The degree to which the air is compressed may be variously changed in accordance with the operating condition of the fuel cell stack 100.

In addition, various types of accessory devices, such as an air filter 212 for filtering out foreign substances such as dust contained in the air to be introduced into the fuel cell stack 100, may be provided in the air supply line 200. The present disclosure is not restricted or limited by the type and structure of the accessory device provided in the air supply line 200. For example, the air filter 212 may be provided in the air supply line 200 and positioned at an upstream side of the air compressor 210.

The cooler 220 is provided in the air supply line 200 and positioned at the downstream side of the air compressor 210. The cooler 220 cools the air having passed through the air compressor 210 (the air to be supplied to the fuel cell stack 100).

That is, the air is supplied to the fuel cell stack 100 in a state of being compressed by the air compressor 210 so that the air may have a sufficient pressure that enables the air to pass through the inner flow path of the fuel cell stack 100. The process of compressing the air generates heat, and the fuel cell stack 100 may be overheated when a temperature of the air to be supplied to the fuel cell stack 100 is raised to a certain level or higher, which may cause a deterioration in performance of the fuel cell stack 100. Therefore, the air compressed by the air compressor 210 may be cooled by the cooler 220 before the air is supplied to the fuel cell stack 100.

A typical air cooler 220 capable of cooling air may be used as the cooler 220. The present disclosure is not restricted or limited by the type and structure of the cooler 220. For example, a typical air-cooled or water-cooled cooler 220 may be used as the cooler 220.

According to the exemplary implementation of the present disclosure, the fuel cell system 10 may include the humidifier 230 positioned in the air supply line 200, positioned at the downstream side of the cooler 220, and configured to humidify the air having passed through the cooler 220.

The humidifier 230 is provided in the air supply line 200 and positioned at the downstream side of the cooler 220. The humidifier 230 humidifies air having passed through the cooler 220.

For example, the humidifier 230 may be configured to humidify air to be supplied to the fuel cell stack 100 by using moist air discharged from the fuel cell stack 100.

In this case, the humidification of air is defined as a process of increasing the humidity of the air.

The humidifier 230 may have various structures capable of humidifying the inflow gas by using the moist air discharged from the fuel cell stack 100. The present disclosure is not restricted or limited by the type and structure of the humidifier 230.

For example, the humidifier 230 may include an inflow gas supply port through which inflow gas (air) is introduced (supplied), an inflow gas discharge port through which the (humidified) inflow gas having passed through the interior of the humidifier 230 is discharged, a moist air supply port through which moist air discharged from the fuel cell stack 100 is supplied, and a moist air discharge port through which the moist air, which has humidified the inflow gas, is discharged to the outside.

The inflow gas (air) supplied to the inflow gas supply port of the humidifier 230 through the air compressor 210 and the air cooler 220 may be humidified by the moist air while passing through a humidification membrane (e.g., a hollow fiber membrane) provided in the form of a tube and disposed in the humidifier 230. Then, the humidified inflow gas may be supplied to the fuel cell stack 100 through the air supply line 200 via the inflow gas discharge port.

Further, the moist air (or the produced water) discharged from the fuel cell stack 100 may be supplied to the moist air supply port, humidify the inflow gas in the humidifier 230, and then be discharged to the outside of the humidifier 230 through the moist air discharge port.

In addition, a gas discharge line may be connected to the humidifier 230, and air (air and condensate water) and hydrogen (hydrogen and condensate water) having passed through the humidifier 230 may be discharged to the outside through the gas discharge line. An air pressure control (APC) may be provided in the gas discharge line and generate backpressure in the fuel cell stack 100. A silencer may be provided in the gas discharge line and reduce exhaust noise caused by exhaust gas (air and hydrogen).

The bypass line 310 is provided to allow a part of air supplied through the air supply line 200 to flow into the enclosure 110. The air supplied into the enclosure 110 (the separation space between the fuel cell stack and the enclosure) through the bypass line 310 may ventilate the interior of the enclosure 110.

More specifically, one end (an inlet end) of the bypass line 310 is connected to the air supply line 200 and disposed between the air compressor 210 and the cooler 220. The other end (an outlet end) of the bypass line 310 is connected to the separation space 112 between the fuel cell stack 100 and the enclosure 110.

The bypass line 310 may have various structures capable of connecting the enclosure 110 and the air supply line 200. The present disclosure is not restricted or limited by the structure and shape of the bypass line 310.

For example, referring to FIG. 1, the bypass line 310 may have a shape bent along a layout of the fuel cell stack 100 and a layout of the humidifier 230 and be connected to an approximately upper end (based on FIG. 1) of the enclosure 110. According to another implementation of the present disclosure, the bypass line may be connected to a lateral side of the enclosure, a lower end of the enclosure, or other portions of the enclosure.

The circulation line 320 is provided to circulate the air, which has passed through (has ventilated) the interior of the enclosure 110 (the separation space between the fuel cell stack and the enclosure), to the air supply line 200 again.

More specifically, one end (an inlet end) of the circulation line 320 may be connected to the separation space 112 between the fuel cell stack 100 and the enclosure 110, and the other end (an outlet end) of the circulation line 320 may be disposed at the downstream side of the cooler 220 and connected to the air supply line 200. The air having passed through the interior of the enclosure 110 may be circulated (resupplied) to the air supply line through the circulation line 320.

For example, referring to FIG. 1, the circulation line 320 may be connected to an approximately lower end of the enclosure 110. According to another implementation of the present disclosure, the circulation line may be connected to the upper end of the enclosure, the lateral side of the enclosure, or other portions of the enclosure.

According to the exemplary implementation of the present disclosure, the other end (the outlet end) of the circulation line 320 may be disposed between the cooler 220 and the humidifier 230 and connected to the air supply line 200. The air (see BA in FIG. 2) supplied to the air supply line 200 through the circulation line 320 (the air having passed through the interior of the enclosure 110) may be mixed with the air (see CA in FIG. 2) having passed through the cooler 220.

As described above, in the implementation of the present disclosure, a part of the air supplied to the fuel cell stack 100 through the air supply line 200 is supplied to the separation space 112 between the fuel cell stack 100 and the enclosure 110 through the bypass line 310 and then circulated to the air supply line 200 again through the circulation line 320. Therefore, it is possible to obtain an advantageous effect of effectively ventilating the separation space 112 between the fuel cell stack 100 and the enclosure 110 and preventing a situation in which condensate water remains in the separation space 112.

Among other things, in the implementation of the present disclosure, the air having passed through the air compressor 210 flows to the enclosure 110 before passing through the cooler 220, and the air, which has passed through (has ventilated) the enclosure 110, circulates to the air supply line 200 again from the downstream side of the air compressor 210 (the downstream side of the cooler 220) instead of the upstream side of the air compressor 210. Therefore, it is possible to obtain an advantageous effect of minimizing a deterioration in efficiency of the air compressor 210 and stably ensuring a supply flow rate of air to be supplied to the fuel cell stack 100.

That is, in a case in which a maximum supply flow rate of the air, which may be supplied, is 400 kg/h and a flow rate (ventilation flow rate) of the air, which flows to the enclosure 110 through the bypass line 310, is 10 kg/h at the maximum RPM (maximum revolutions per minute) of the air compressor 210, the air having passed through the enclosure 110 may be merged again into the air supply line 200 at the downstream side of the air compressor 210 (the downstream side of the cooler) and supplied to the fuel cell stack 100 even though a part (e.g., 10 kg/h) of the air supplied through the air supply line 200 flows into the enclosure 110. Therefore, the maximum flow rate of the air finally supplied to the fuel cell stack 100 may satisfy the target flow rate of 400 kg/h according to the maximum RPM of the air compressor 210.

In contrast, in a case in which the air having flowed into the enclosure 110 circulates to the air supply line 200 from the upstream side of the air compressor 210 instead of the downstream side of the air compressor 210, the maximum flow rate of the air to be supplied to the fuel cell stack 100 may be reduced to 390 kg/h by the flow rate (e.g., 10 kg/h) of the air flowing into the enclosure 110 through the bypass line 310. For this reason, it is difficult to supply the air to the fuel cell stack 100 at the target flow rate (e.g., 400 kg/h) according to the maximum RPM of the air compressor 210.

In addition, in the implementation of the present disclosure, the air having passed through the air compressor 210 flows to the enclosure 110 before passing through the cooler 220, and the air, which has passed through (has ventilated) the enclosure 110, circulates to the air supply line 200 again from the downstream side of the air compressor 210 (the downstream side of the cooler 220) instead of the upstream side of the air compressor 210. Therefore, a differential pressure of the cooler 220 (a differential pressure between the inlet end and the outlet end of the cooler), i.e., resistance made by the cooler, may ensure a smooth flow of air from the air supply line 200 to the bypass line 310. Therefore, it is possible to ensure a sufficient flow rate (ventilation flow rate) of air to be supplied to the enclosure 110 through the bypass line 310.

That is, in a case in which both one end of the bypass line and the other end of the circulation line are connected to the air supply line at the position between the air compressor and the cooler (or both one end of the bypass line and the other end of the circulation line are connected to the air supply line at the downstream side of the cooler), a differential pressure (resistance) made by the cooler is not applied. For this reason, it is difficult to ensure a sufficient flow rate (ventilation flow rate) of air to be supplied to the enclosure through the bypass line. However, in the implementation of the present disclosure, one end of the bypass line is connected to the air supply line at the upstream side of the cooler (between the air compressor and the cooler), and the other end of the circulation line is connected to the air supply line at the downstream side of the cooler. Therefore, it is possible to obtain an advantageous effect of ensuring a sufficient flow rate (ventilation flow rate) of air to be supplied to the enclosure 110 through the bypass line 310.

Moreover, in the implementation of the present disclosure, because the air, which has passed through (has ventilated) the enclosure 110, circulates to the air supply line 200 again from the downstream side of the air compressor 210 (the downstream side of the cooler 220), the air (air containing droplets), which has passed through (has ventilated) the enclosure 110, is prevented from being introduced directly into the air compressor 210. Therefore, it is possible to obtain an advantageous effect of improving safety and reliability while preventing damage to the air compressor 210 caused by the droplets contained in the air (e.g., damage to a blade of the air compressor caused by the droplets).

In addition, according to the exemplary implementation of the present disclosure, it is not necessary to additionally provide a separate fan (an air supply fan) to forcibly supply the air for ventilating the interior of the enclosure 110. Therefore, it is possible to obtain an advantageous effect of simplifying the structure and improving the degree of design freedom and spatial utilization.

According to the exemplary implementation of the present disclosure, the fuel cell system 10 may include a buffer space 240 disposed between the cooler 220 and the humidifier 230 and configured to communicate with the air supply line 200. The circulation line 320 may be connected to the buffer space 240.

This is to allow the high-temperature air BA, which has passed through the enclosure 110, to be supplied after being mixed with the air CA cooled by the cooler 220 without being supplied directly to the humidifier 230.

That is, if the high-temperature air BA having passed through the enclosure 110 is supplied directly to the humidifier 230, there is concern that the high-temperature air BA may damage the humidification membrane of the humidifier 230 and a potting material configured to support the humidification membrane. However, according to the implementation of the present disclosure, the high-temperature air BA having passed through the enclosure 110 is supplied to the humidifier 230 in a state in which the high-temperature air BA is mixed with the air CA cooled by the cooler 220 (in a state in which a temperature of the air is decreased). Therefore, it is possible to obtain an advantageous effect of preventing damage to the humidification membrane and the potting material caused by the high-temperature air.

The buffer space 240 may be provided in various ways in accordance with required conditions and design specifications. The present disclosure is not restricted or limited by the structure of the buffer space 240.

For example, the buffer space 240 may be disposed in a humidifier housing that defines an external appearance of the humidifier 230. According to another implementation of the present disclosure, the buffer space may be defined by a connection member provided separately from the humidifier housing.

According to the exemplary implementation of the present disclosure, the fuel cell system 10 may include an air guide 330 provided in the buffer space 240 and configured to guide the air, which is introduced into the buffer space 240 through the circulation line 320, toward the cooler 220.

As described above, the air guide 330 is provided in the buffer space 240 and guides the air, which is introduced into the buffer space 240, toward the cooler 220. Therefore, it is possible to obtain an advantageous effect of maximally preventing the air BA having passed through the enclosure 110 from being introduced directly into the humidifier 230. Further, it is possible to obtain an advantageous effect of more quickly and effectively decreasing the temperature of the air BA having passed through the enclosure 110.

The air guide 330 may have various structures capable of guiding the air, which is introduced into the buffer space 240, toward the cooler 220. The present disclosure is not restricted or limited by the structure and shape of the air guide 330.

For example, the air guide 330 may include an inclined guide surface having a straight shape for guiding the air, which is introduced into the buffer space 240, toward the cooler 220.

For reference, in the implementation of the present disclosure illustrated and described above, the example has been described in which the inclined guide surface has a straight shape. However, according to another implementation of the present disclosure, the inclined guide surface may have a curved shape or other shapes.

According to the exemplary implementation of the present disclosure, the fuel cell system 10 may include a bypass valve 312 disposed in the bypass line 310 and configured to adjust a flow of air flowing through the bypass line 310.

For reference, in the implementation of the present disclosure, the operation of adjusting a flow of air flowing through the bypass line 310 may include both an operation of turning on or off a flow of air flowing through the bypass line 310 and an operation of adjusting a flow rate of air flowing through the bypass line 310.

Various valves capable of opening or closing the bypass line 310 may be used as the bypass valve 312. The present disclosure is not restricted or limited by the type and structure by the bypass valve 312.

For example, a check valve configured to selectively open or close the bypass line 310 based on a pressure of air flowing through the bypass line 310 may be used as the bypass valve 312.

For example, in a case in which a pressure difference of the check valve for opening the bypass line is set to 1.5 KPa, the check valve may close the bypass line when the pressure difference (a pressure difference between front and rear ends of a valve disc of the check valve) is 1 KPa based on a current density of 1.0 A/cm$^2$, and the check valve may open the bypass line when the pressure difference is 2 KPa based on a current density of 1.2 A/cm$^2$.

As another example, a thermo-valve (or a thermostat) configured to selectively open or close the bypass line 310 based on a temperature of air flowing through the bypass line 310 may be used as the bypass valve 312.

For example, in a case in which a temperature of the thermo-valve for opening the bypass line is set to 100° C., the thermo-valve may close the bypass line when a reference temperature of air is 90° C. based on a current density of 1.0 A/cm$^2$, and the thermo-valve may open the bypass line when the reference temperature of air is 110° C. based on a current density of 1.2 A/cm$^2$.

As described above, in the implementation of the present disclosure, the bypass valve 312 is provided in the bypass line 310, which makes it possible to adjust and manage a flow rate of air to be supplied to the enclosure 110 to ventilate the enclosure 110 in accordance with the operating condition of the fuel cell stack 100.

In addition, in the implementation of the present disclosure, the bypass line 310 may be selectively opened or closed by the bypass valve 312, and thus the bypass line 310 may be selectively opened only when the pressure and temperature of the air flowing through the bypass line 310 satisfy preset reference conditions. Therefore, it is possible to obtain an advantageous effect of preventing the air supplied through the air supply line 200 from flowing through the bypass line 310 in a situation in which the ventilation of the enclosure 110 is not required.

Further, when the required output of the fuel cell stack 100 increases, the amount of hydrogen required to operate the fuel cell stack 100 increases, and the amount of moisture (condensate water) increases, such that the necessity of the ventilation of the separation space between the fuel cell stack 100 and the enclosure 110.

According to the implementation of the present disclosure, the bypass valve 312 (e.g., the check valve or the thermo-valve) may selectively open or close the bypass line 310 even though the temperature and pressure of the air at the downstream side of the air compressor 210 increase as the required output of the fuel cell stack 100 increases. Therefore, it is possible to effectively cope with the increase in temperature and pressure of the air at the downstream side of the air compressor 210.

In addition, according to the exemplary implementation of the present disclosure, the fuel cell system 10 may include a circulation valve 322 disposed in the circulation line 320 and configured to adjust a flow of air flowing through the circulation line 320.

For reference, in the implementation of the present disclosure, the operation of adjusting a flow of air flowing through the circulation line 320 may include both an operation of turning on or off a flow of air flowing through the circulation line 320 and an operation of adjusting a flow rate of air flowing through the circulation line 320.

Various valves capable of opening or closing the circulation line 320 may be used as the circulation valve 322. The present disclosure is not restricted or limited by the type and structure of the circulation valve 322.

For example, a typical solenoid valve or a butterfly valve may be used as the circulation valve 322. In particular, a solenoid valve suitable for adjusting a low flow rate may be used as the circulation valve 322.

The circulation valve 322 may be variously changed in operating point in time and operational condition in accordance with required conditions and design specifications. The present disclosure is not restricted or limited by the operating point in time and operational condition of the circulation valve 322.

According to the exemplary implementation of the present disclosure, the circulation valve 322 may adjust a flow of air flowing through the circulation line 320 so that a temperature of an air mixture (BA+CA) made by mixing the air BA having passed through the enclosure 110 and the air CA having passed through the cooler 220 is less than 90° C.

For example, when the temperature of the air mixture (BA+CA) introduced into the humidifier 230 is higher than 90° C., the circulation valve 322 may close the circulation line 320.

In contrast, when the temperature of the air mixture (BA+CA) introduced into the humidifier 230 is lower than 90° C., the circulation valve 322 may adjust a flow rate of the air flowing into the enclosure 110 (a flow rate of the air to be introduced into the buffer space) by adjusting an opening ratio based on a temperature of the air flowing from the air supply line 200 to the bypass line 310 (a temperature of the air at the inlet end of the bypass line). For example, the opening ratio of the circulation valve 322 may be defined as 30% when the temperature of the air at the inlet end of the bypass line 310 is 140° C. The opening ratio of the circulation valve 322 may be defined as 50% when the temperature of the air at the inlet end of the bypass line 310 is 120° C. The opening ratio of the circulation valve 322 may be defined as 70% when the temperature of the air at the inlet end of the bypass line 310 is 100° C.

Figure 3:
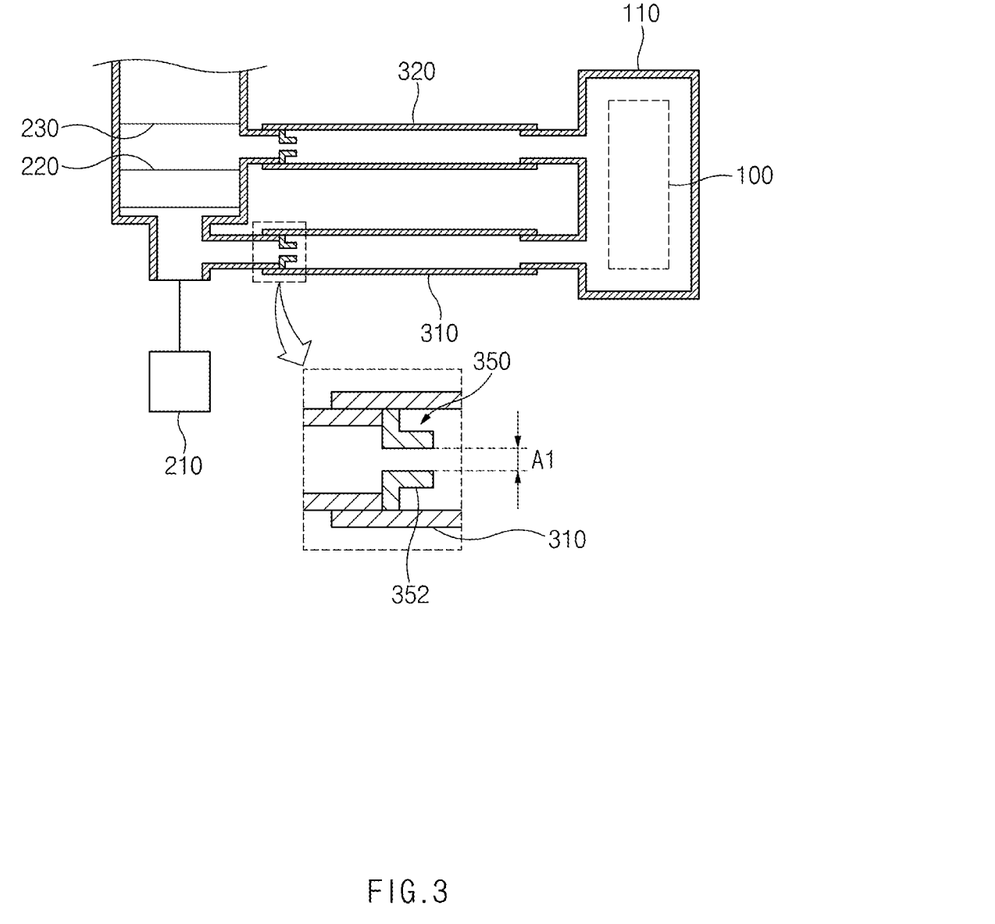
FIGS. 3 and 4 are schematic views illustrating an example flow path change unit in the fuel cell system according to the implementation of the present disclosure.
Figure 4:
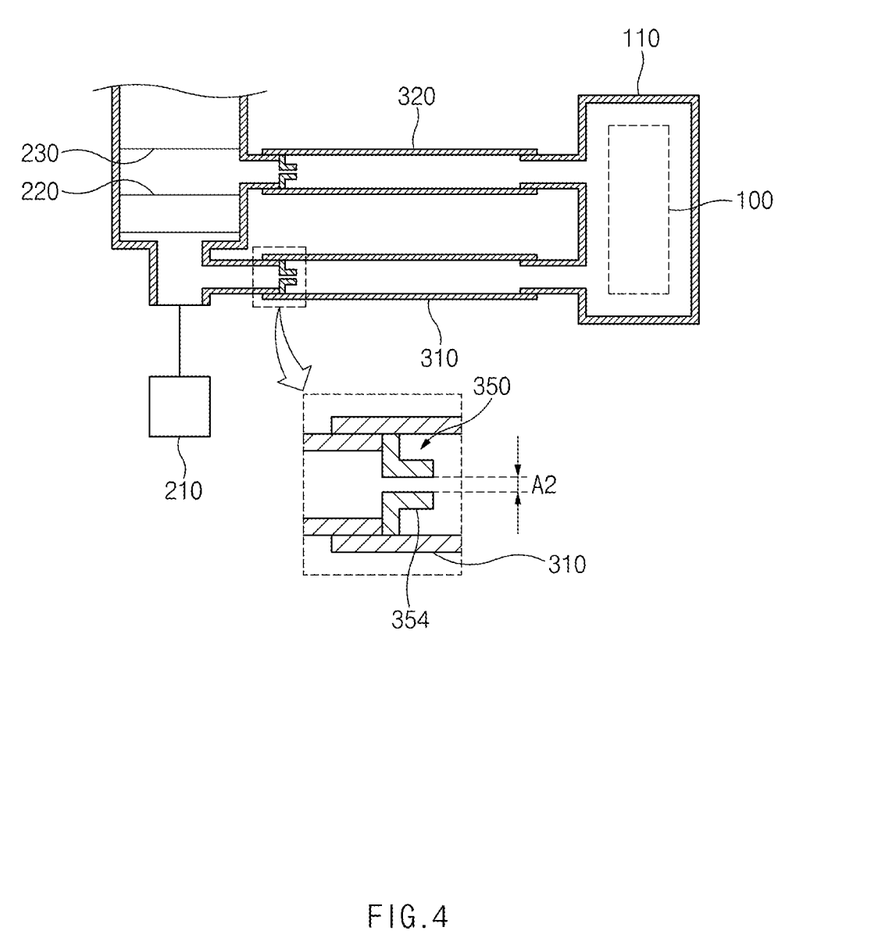

Referring to FIGS. 3 and 4, according to the exemplary implementation of the present disclosure, the fuel cell system 10 may include a flow path change unit 350 disposed in at least any one of the bypass line 310 and the circulation line 320 and configured to change a cross-sectional flow path area through which air passes.

The flow path change unit 350 is provided to minimize a deviation of the ventilation flow rate (the flow rate of the air flowing from the air supply line to the enclosure) caused by the layout of the bypass line 310 and the layout of the circulation line 320.

That is, the bypass line 310 and the circulation line 320 may be variously changed in lengths and structures in accordance with required conditions and design specifications (e.g., the layout of the humidifier and the layout of the fuel cell stack). Because the differential pressure varies depending on the lengths and structures of the bypass line 310 and the circulation line 320, a deviation of the flow rate (ventilation flow rate) of the air flowing from the air supply line 200 to the enclosure 110 may occur because of the lengths and structures of the bypass line 310 and the circulation line 320.

However, according to the implementation of the present disclosure, the flow path change unit 350 may be provided in at least any one of the bypass line 310 and the circulation line 320 and adjust the differential pressure of the bypass line 310 or the circulation line 320. Therefore, it is possible to obtain an advantageous effect of minimizing the deviation of the ventilation flow rate (the flow rate of the air flowing from the air supply line to the enclosure) caused by the layout of the bypass line 310 and the layout of the circulation line 320.

The flow path change unit 350 may have various structures capable of changing the cross-sectional flow path area through which air passes. The present disclosure is not restricted or limited by the structure of the flow path change unit 350.

According to the exemplary implementation of the present disclosure, the flow path change unit 350 may include a first adapter member 352 having a first cross-sectional flow path area (e.g., A1) through which air passes, and a second adapter member 354 having a second cross-sectional flow path area (e.g., A2) different from the first cross-sectional flow path area. At least any one of the first adapter member 352 and the second adapter member 354 may be provided in at least any one of the bypass line 310 and the circulation line 320 and change the cross-sectional flow path area.

Hereinafter, an example will be described in which the first adapter members 352 (or the second adapter members) are respectively provided at the inlet end of the bypass line 310 and the outlet end of the circulation line 320.

For example, the second adapter member 354 may have the second cross-sectional flow path area smaller than the first cross-sectional flow path area of the first adapter member 352.

The first and second adapter members 352 and 354 may be provided in various ways in accordance with required conditions and design specifications.

For example, the first adapter member 352 or the second adapter member 354 may be integrated, by injection molding, with a port provided in the humidifier housing so that the bypass line 310 and the circulation line 320 are connected. According to another implementation of the present disclosure, the first adapter member or the second adapter member may be separably coupled (fastened) to the port provided in the humidifier housing.

For reference, in the implementation of the present disclosure illustrated and described above, the example has been described in which the flow path change unit 350 includes the two adapter members 352 and 354 having the different cross-sectional flow path areas. However, according to another implementation of the present disclosure, the flow path change unit may include three or more adapter members having different cross-sectional flow path areas.

In addition, in the implementation of the present disclosure illustrated and described above, the example has been described in which the same adapter members (the first adapter members or the second adapter members) are respectively provided at the inlet end of the bypass line 310 and the outlet end of the circulation line 320. However, according to another implementation of the present disclosure, the first adapter member may be provided at the inlet end of the bypass line, and the second adapter member may be provided at the outlet end of the circulation line.

Figure 5:
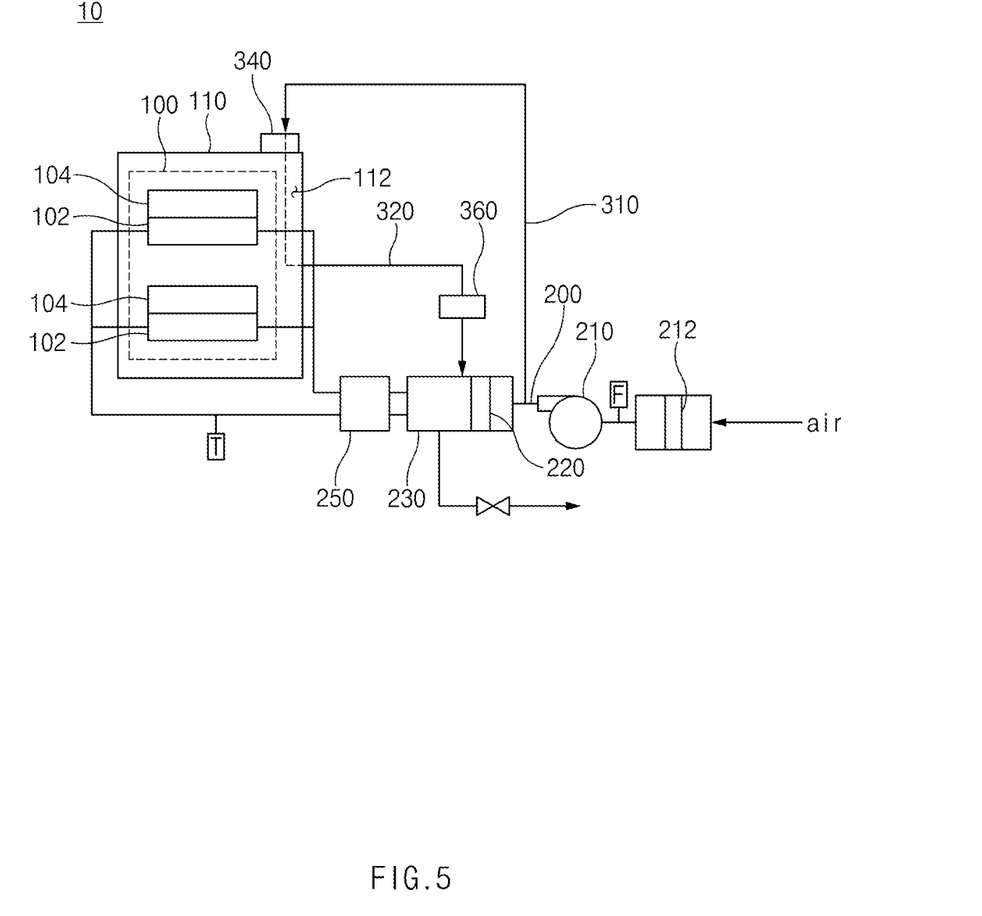
FIG. 5 is a schematic view of an example filter member in the fuel cell system according to the implementation of the present disclosure.

Referring to FIG. 5, according to the exemplary implementation of the present disclosure, the fuel cell system 10 may include a filter member 340 disposed in the bypass line 310 and configured to filter the air passing through the bypass line 310.

In this case, the configuration in which the air is filtered means a configuration in which the filter member 340 filters out foreign substances such as dust contained in the air.

Various filters capable of filtering the air passing through the bypass line 310 may be used as the filter member 340. The present disclosure is not restricted or limited by the type and structure of the filter member 340.

For example, the filter member 340 may be disposed at the outlet end of the bypass line 310. A typical dry filter or a paper filter (e.g., an air filter) may be used as the filter member 340.

Because the filter member 340 is provided in the bypass line 310 as described above, the air to be supplied to the fuel cell stack 100 through the air supply line 200 may be primarily filtered by the air filter 212 and then secondarily filtered by the filter member 340. Therefore, it is possible to obtain an advantageous effect of minimizing the number of foreign substances such as dust to be introduced into the enclosure 110 and the fuel cell stack 100 and further improving safety and reliability.

In addition, according to the exemplary implementation of the present disclosure, a circulation line filter member 360 may be disposed in the circulation line 320, and the circulation line filter member 360 may filter the air before the air having passed through the interior of the enclosure 110 is introduced into the air supply line 200. Various filters capable of filtering the air passing through the circulation line 320 may be used as the circulation line filter member 360. The present disclosure is not restricted or limited by the type and structure of the circulation line filter member 360.

Because the circulation line filter member 360 is provided in the circulation line 320 as described above, it is possible to obtain an advantageous effect of preventing foreign substances in the enclosure 110 from being introduced into the air supply line 200 through the circulation line 320 together with the air and improving safety and reliability.

According to the present disclosure as described above, it is possible to obtain an advantageous effect of improving safety and reliability.

In particular, according to the implementation of the present disclosure, it is possible to obtain an advantageous effect of effectively ventilating the separation space between the fuel cell stack and the enclosure and preventing a situation in which condensate water remains in the separation space.

In addition, according to the implementation of the present disclosure, it is possible to obtain an advantageous effect of minimizing a deterioration in efficiency of the air compressor and preventing damage to the air compressor.

In addition, according to the implementation of the present disclosure, it is possible to obtain an advantageous effect of ensuring efficiency in ventilating the enclosure and an advantageous effect of stably ensuring a supply flow rate of air to be supplied to the fuel cell stack.

In addition, according to the implementation of the present disclosure, it is possible to obtain an advantageous effect of maintaining a constant ventilation flow rate of air to be supplied to the enclosure without being restricted by the layout of the peripheral component.

In addition, according to the implementation of the present disclosure, it is possible to obtain an advantageous effect of preventing damage to the humidifier while ensuring efficiency in ventilating the enclosure.

In addition, according to the implementation of the present disclosure, it is possible to obtain an advantageous effect of simplifying the structure, improving the degree of design freedom and spatial utilization, and reducing costs.

In addition, according to the implementation of the present disclosure, it is possible to obtain an advantageous effect of preventing the level of condensate water from being excessively increased in the enclosure and an advantageous effect of meeting the waterproof requirements (IPX7) with respect to immersion in water up to 1 meter in depth.

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective elements specifically described in the implementations may be modified and then carried out. Further, it should be interpreted that the differences related to the modifications and applications are included in the scope of the present disclosure defined by the appended claims.

What is claimed is:

1. A fuel cell system comprising:
   a fuel cell stack;
   an enclosure that surrounds the fuel cell stack;
   an air supply line connected to the fuel cell stack and configured to supply air to the fuel cell stack;
   an air compressor connected to the air supply line and configured to compress the air supplied to the fuel cell stack;

a cooler (i) connected to the air supply line, (ii) positioned at a downstream side of the air compressor, and (iii) configured to cool the air having passed through the air compressor;

a bypass line having (i) a first end disposed between the air compressor and the cooler and connected to the air supply line and (ii) a second end connected to a separation space between the fuel cell stack and the enclosure; and a circulation line having (i) a first end connected to the separation space and (ii) a second end disposed at a downstream side of the cooler and connected to the air supply line.

2. The fuel cell system of claim 1, comprising:
a humidifier (i) connected to the air supply line, (ii) positioned at the downstream side of the cooler, and (iii) configured to humidify the air having passed through the cooler.

3. The fuel cell system of claim 2, wherein the second end of the circulation line is disposed between the cooler and the humidifier and connected to the air supply line.

4. The fuel cell system of claim 3, comprising:
a buffer space disposed between the cooler and the humidifier and configured to communicate with the air supply line,
wherein the circulation line is connected to the buffer space.

5. The fuel cell system of claim 4, comprising:
an air guide disposed in the buffer space and configured to guide toward the cooler the air that is introduced into the buffer space through the circulation line.

6. The fuel cell system of claim 1, comprising:
a bypass valve disposed in the bypass line and configured to adjust a flow of air flowing through the bypass line.

7. The fuel cell system of claim 6, wherein the bypass valve is configured to selectively adjust the flow of the air flowing through the bypass line based on a temperature or pressure of the air flowing through the bypass line.

8. The fuel cell system of claim 1, comprising:
a circulation valve disposed in the circulation line and configured to adjust a flow of air flowing through the circulation line.

9. The fuel cell system of claim 8, wherein the circulation valve is configured to selectively adjust the flow of the air flowing through the circulation line based on a temperature of the air flowing through the bypass line.

10. The fuel cell system of claim 1, comprising:
a filter member disposed in the bypass line and configured to filter the air passing through the bypass line.

11. The fuel cell system of claim 1, comprising:
a flow path changer disposed in at least any one of the bypass line or the circulation line and configured to change a cross-sectional flow path area through which the air passes.

12. The fuel cell system of claim 11, wherein the flow path changer decreases the cross-sectional flow path area through which the air passes.

13. The fuel cell system of claim 11, wherein the flow path changer comprises:
a first adapter member having a first cross-sectional flow path area through which air passes; and
a second adapter member having a second cross-sectional flow path area different from the first cross-sectional flow path area, and
wherein at least any one of the first or second adapter members is disposed in at least any one of the bypass line or the circulation line and changes the cross-sectional flow path area.

14. The fuel cell system of claim 13, wherein the first and second cross-sectional flow path areas are less than cross-sectional flow path areas of the bypass lines and the circulation line.

15. The fuel cell system of claim 1, comprising:
a circulation line filter member disposed in the circulation line and configured to filter the air passing through the circulation line.

* * * * *